United States Patent
Koppenstein et al.

[11] Patent Number: 5,417,465
[45] Date of Patent: May 23, 1995

[54] TOP COVER BOX FOR MOTOR VEHICLES

[75] Inventors: Harald Koppenstein, Filderstadt; Stefan Orth, Sindelfingen, both of Germany

[73] Assignee: Mercedes-Benz AG, Germany

[21] Appl. No.: 60,549

[22] Filed: May 13, 1993

[30] Foreign Application Priority Data

May 13, 1992 [DE] Germany ............... 42 15 750.1

[51] Int. Cl.[6] ........................... B60R 13/01
[52] U.S. Cl. ...................... 296/39.1; 296/208
[58] Field of Search ............. 296/37.1, 39.1, 136, 296/38, 208, 213

[56] References Cited

U.S. PATENT DOCUMENTS

| | | | |
|---|---|---|---|
| 250,727 | 12/1881 | Gurney | 296/38 X |
| 2,707,129 | 4/1955 | Orr . | |
| 3,143,373 | 8/1964 | Fordyce | 296/208 X |
| 4,801,169 | 1/1989 | Queen et al. | 296/39.2 X |
| 4,892,351 | 1/1990 | Ono et al. | 296/208 X |
| 5,127,703 | 7/1992 | Takahashi | 296/208 X |

FOREIGN PATENT DOCUMENTS

| | | | |
|---|---|---|---|
| 3215195A1 | 10/1983 | Germany | 296/208 |
| 3736780 | 12/1988 | Germany . | |
| 205240 | 12/1982 | Japan | 296/39.1 |
| 3-153480A | 7/1991 | Japan | 296/208 |
| 669054 | 3/1952 | United Kingdom | 296/208 |

OTHER PUBLICATIONS

Search Report.

Primary Examiner—Robert J. Oberleitner
Assistant Examiner—Gary C. Hoge
Attorney, Agent, or Firm—Evenson, McKeown, Edwards & Lenahan

[57] ABSTRACT

A top cover box for vehicles is disclosed, which is lined on its walls and its bottom with covering that has water-repellent properties, and which is provided with an outflow aperture in a low-lying region of the bottom, the covering having a downslope in the bottom region which conducts water to the outflow aperture. In order to achieve a substantial improvement of the structural possibilities in the design of the top cover box bottom, without disadvantages for the removal of water from the top cover box, the covering is combined to form an insert encompassing walls and a bottom, which insert is of dimensionally stable and watertight design, a groove-like recess being formed on the bottom of the insert and having a downslope leading to the outflow aperture. The bottom of the insert comprises a large-format surface region with a downslope extending transversely to the longitudinal extent of the recess and towards the latter.

8 Claims, 3 Drawing Sheets

TOP COVER BOX FOR MOTOR VEHICLES

BACKGROUND AND SUMMARY OF THE INVENTION

The invention relates to a top cover box for motor vehicles of the type which is lined on its walls and its bottom with covering that has water-repellent properties, and which is provided with an outflow aperture in a low-lying region of the bottom, the covering having a downslope in the bottom region which conducts water to the outflow aperture.

Such a top cover box with lining is in use, for example, in the SL convertible series of Mercedes-Benz AG, and is thus known.

In this known top cover box, the lining consists of individual sheets of needled felt which, after being cut to size, are bonded flat on the bottom and walls of the top cover box, adopting the shape of the surfaces which support them.

Although the top cover box is covered by means of a lid at its upward-facing aperture, which lid is swung up only in order to open or close the top cover, it is nevertheless designed as a so-called wet space. This design serves the purpose of removing water which has entered the top cover box as rapidly as possible to the outside, so that a permanently damp environment cannot develop in the top cover box, which would be disadvantageous for the corrosion resistance of the painted sheet metal parts and would favor the undesirable formation of mould on the needled felt sheets and/or the top cover.

The entry of water into the top cover box may occur not only as a consequence of leaks but also because the top cover is lowered into the top cover box while still wet with rain.

In order to permit rapid removal of water from the known top cover box, the bottom thereof has a continuous forward downslope which runs into funnel-shaped recesses on both sides of the top cover box, each of which defines an outflow aperture. Moreover, the needled felt sheets are impregnated with a water-repellent substance, as a result of which absorption of the water by the needled felt sheets is prevented.

Because of the functional principle of water removal, the structural design possibilities for the top cover box in the region of the bottom thereof are substantially restricted.

This applies to the shaping of the bodywork panel itself forming the bottom of the top cover box, which must offer a continuous downslope at each point of the bottom. Moreover, no fittings must be attached to the bottom of the top cover box which would partially impede the complete outflow of the water.

An object of the invention is further to develop a top cover box of the generic type so that structural freedom of design for the top cover box bottom is distinctly increased without disadvantageous effects on the removal of water from the top cover box.

This object is achieved, according to the invention, by providing an arrangement wherein the covering of the top cover box is combined to form an insert encompassing walls and a bottom, which insert is of dimensionally stable and watertight design, wherein a groove-like recess is let into the bottom of the insert which has a downslope leading to the outflow aperture, and wherein the bottom of the insert comprises a large-format surface region with a downslope extending transversely to the longitudinal extent of the recess and towards the latter. In the region covered by the insert, the water removal towards the outflow is determined exclusively by the bottom of the insert, provided with a suitable downslope, so that the top cover box bottom of the bodywork can be designed as desired, apart from any necessary support bearing points. Thus a partially fissured sheet metal structure can be provided, as may be desirable, for example, for reasons of rigidity. Also, lines such as, for example, cables or even hydraulic lines, if appropriate with assigned hydraulic units, can readily be attached directly to the top cover box bottom, or perforations or the like can be provided, since no influence is exerted thereby on the water removal. If, for example, only a rear part of the top cover box is lined with the insert and the outflow apertures are at the front in the lateral legs of the top cover box, then the downslope to the outflow apertures in the rear part of the bottom of the insert and in front thereof—between insert and outflow—can be determined by the lateral top cover box bottom.

The two-level division of the water outflow through the insert bottom, moreover, permits a downslope in large format surface regions which can also run in the opposite direction to the downslope of the channel-shaped recess. As a result, with good utilization of structural space, a sufficient downslope can be provided. Furthermore, the position of the outflow aperture can be determined in accordance with design aspects.

If the top cover box is very extensively lined with the insert, or if the outflow aperture or a plurality of outflow apertures are in the rear region of the top cover box, the outflow aperture is covered by the insert, as a result of which the downslope must be provided exclusively by the bottom of the insert.

In order to prevent drops of water diverted by the insert from reaching the top cover box bottom, the downslope of the recess preferably ends in a pipe connector piece which projects downwards from the underside of the insert bottom and extends into the outflow aperture of the top cover box bottom.

An outflow of water from the insert which is free of blocking-up is ensured if the pipe connector piece is molded to the bottom of the insert at least over part of its bottom length.

Expediently, an outflow aperture is arranged on both sides of the vehicle in the top cover box, since as a result of this the flow paths on the bottom of the insert can be shorter, so that better utilization of the structural space can be achieved as compared with the single outflow aperture, with a predetermined downslope.

By adapting the top cover box to cover concepts of a known type and optimizing the hollow volume of the top cover box, a backward-directed downslope can prevail in the top cover box, but at the same time a downslope away from the middle of the top cover box to its sides can be present. In this case, the downslope area of the insert bottom can advantageously be surrounded by a conducting channel which consists of the groove-shaped recess in the insert bottom and has a forward-directed downslope on part of its lateral lengths.

In order to conform to varied requirements, the insert preferably consists of a multi-layer molding with a watertight barrier layer of plastic.

Such a molding can be economically produced as a three-layer laminate whose outer layers, surrounding the central plastic layer, consist of textile material. Materials which have proved suitable are a particularly moldable synthetic fibre non-woven as an outer layer lying on the top cover box and a needled felt material as the outer layer which remains visible, this combination of materials being known per se for lining bodywork areas.

Because of the dimensional stability of the molding it can be reliably connected to the top cover box by a plurality of spot-type connecting means, it being possible for the spot-type connecting means to be provided in the conveniently accessible upper edge region of the walls.

Other objects, advantages and novel features of the present invention will become apparent from the following detailed description of the invention when considered in conjunction with the accompanying drawings.

DETAILED DESCRIPTION OF THE DRAWINGS

Figure 1:
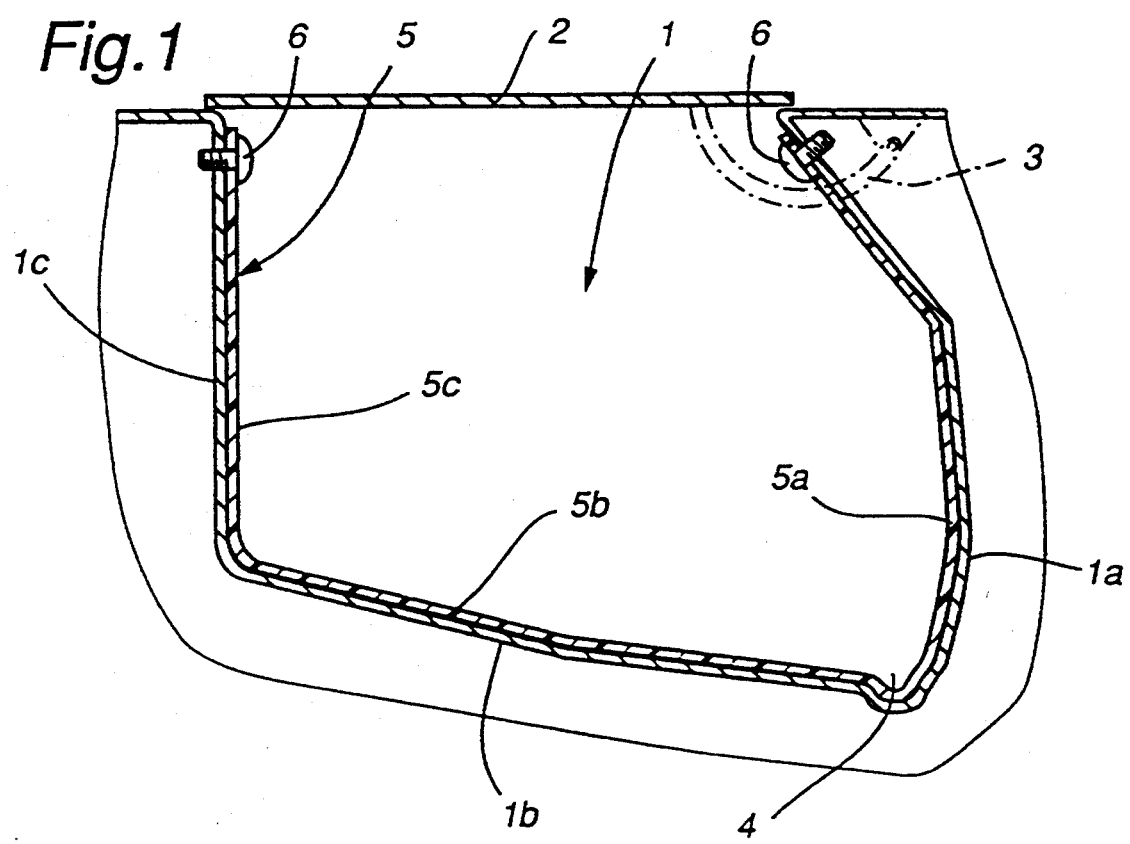
FIG. 1 is a schematic median longitudinal sectional view through a top cover box of a convertible car constructed according to a preferred embodiment of the invention.

A top cover box 1, visible in FIG. 1, of a four-seater convertible car which is not illustrated in more detail conventionally has, seen from above, an approximately U-shaped extent, surrounding the rear-seat region at the back and sides and extending, with the front longitudinal region of its lateral legs, alongside lowerable rear side windows of the convertible car. The upward-facing aperture of the top cover box 1, inset into the vehicle bodywork, is closed by means of a suitably shaped top cover box lid 2, which can be pivoted up about a transverse axis of the vehicle, extending behind the top cover box 1, in order that an associated folding top cover of conventional design (not shown) can be lowered.

To this end, the top cover box lid 2, as is indicated by broken lines, can be articulated on the bodywork by bent hinge levers 3, which project through cut-outs in the back of the top cover box 1.

The supporting structure of the top cover box 1 consists of painted bodywork sheet metal and comprises a rear wall 1a, forming the back or outer peripheral wall, a front wall 1c, forming the front or inner peripheral wall, and a bottom 1b connecting the rear wall 1a to the front wall 1c. Viewed in cross-section, therefore, the top cover box 1 is of approximately U-shaped design. The bottom 1b is provided, in the central region shown, with a downslope from front to back and ends in a recess 4 lying immediately in front of the rear wall 1a.

A molding 5, which is substantially inherently stable, is provided to line the top cover box 1 of bodywork sheet metal, is of one-piece design and, in its central region visible in FIG. 1, is exactly adapted to the inner cross-sectional shape of the top cover box 1, so that for its part it has a rear wall 5a, a bottom 5b with recess 4 and a front wall 5c. As a result of frictional fitting, the molding 5 is already retained in a largely unmovable manner in the top cover box 1, so that it is sufficient to secure the walls 5a and 5c, respectively, via spot-type fixing means close to the top cover box aperture to the rear wall 1a and front wall 1c which are covered thereby. To this end, fixing screws 6 accessible from the inner space of the top cover box 1 are provided, as a result of which the molding 5 is particularly simple to exchange. Instead of the fixing screws 6, other conventional spot-type connecting means, such as clips or the like, could also be used.

The molding 5, which has a substantially constant wall thickness of about 4 mm, consists of a three-layer laminate whose layers cannot be non-destructively separated. The watertight central layer consists of extrusion film, such as PP, with which fractions of recyclable thermoplastics may be mixed. Above this central layer are a layer of needled felt impregnated with a moisture-repellent substance and facing the inner space of the top cover box 1, and an outer layer resting on the sheet metal of the top cover box 1 and consisting of thin polyester-based synthetic fibre non-woven, these layers being connected to each other.

Figure 3:
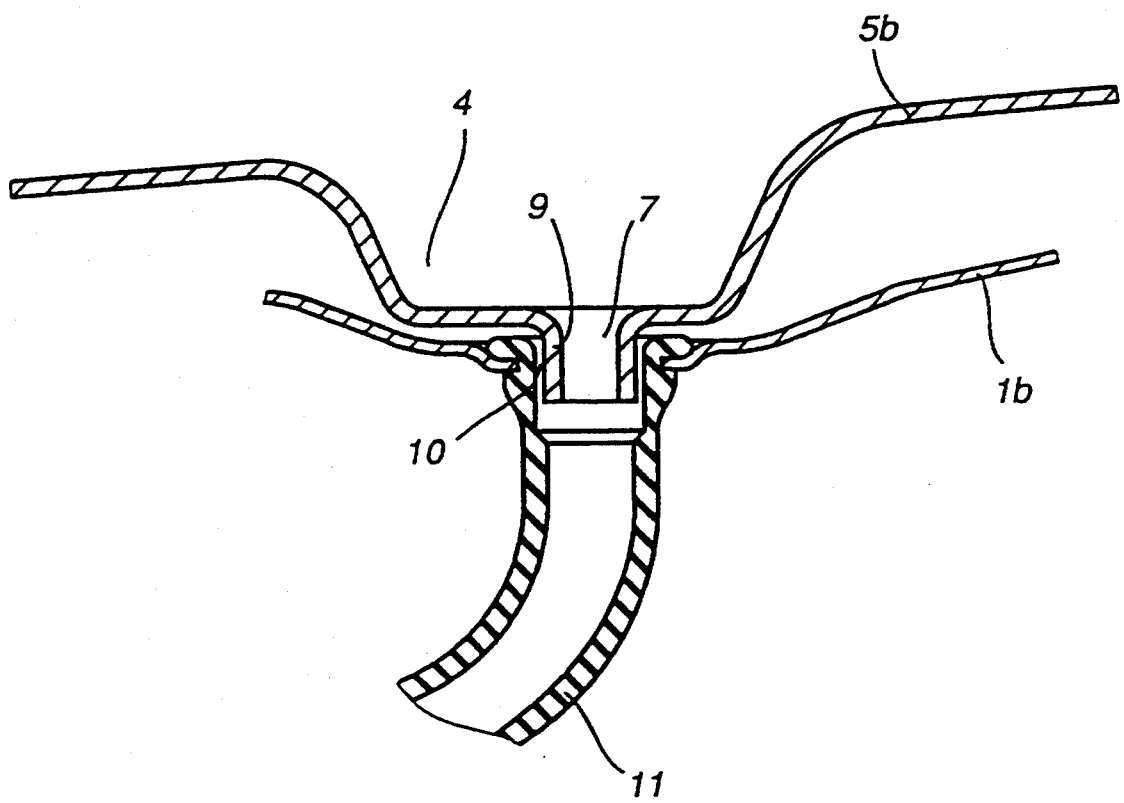
FIG. 3 is a longitudinal sectional view along the line III—III in FIG. 2.

The dimensional stability of this molding 5, made from laminated material, is fully sufficient to bridge, in a self-supporting manner, backward-projecting surface regions of the bottom 1b or of the walls 1a and 1c, as can be seen in FIG. 3. Also, minor perforations in the sheet metal structure can advantageously be masked by means of the molding 5. Thus the relatively wide passage apertures in the vehicle carcass for the hinge levers 3 in the rear wall 1a can largely be covered by the wall 5a, from which it is only necessary to cut out narrow slits adapted to the thickness of the hinge levers 3. Since the inner shape of the top cover box 1 is thus exclusively determined by the molding 5, the bottom 1b need not provide the downslope for water removal from the rear part of the top cover box 1, but can be adapted to more extensive design requirements.

The bottom 5b of the molding 5 has a front-to-rear downslope, as a consequence of which water entering the top cover box 1 is conducted along the bottom 5b to the recess 4.

Figure 2:
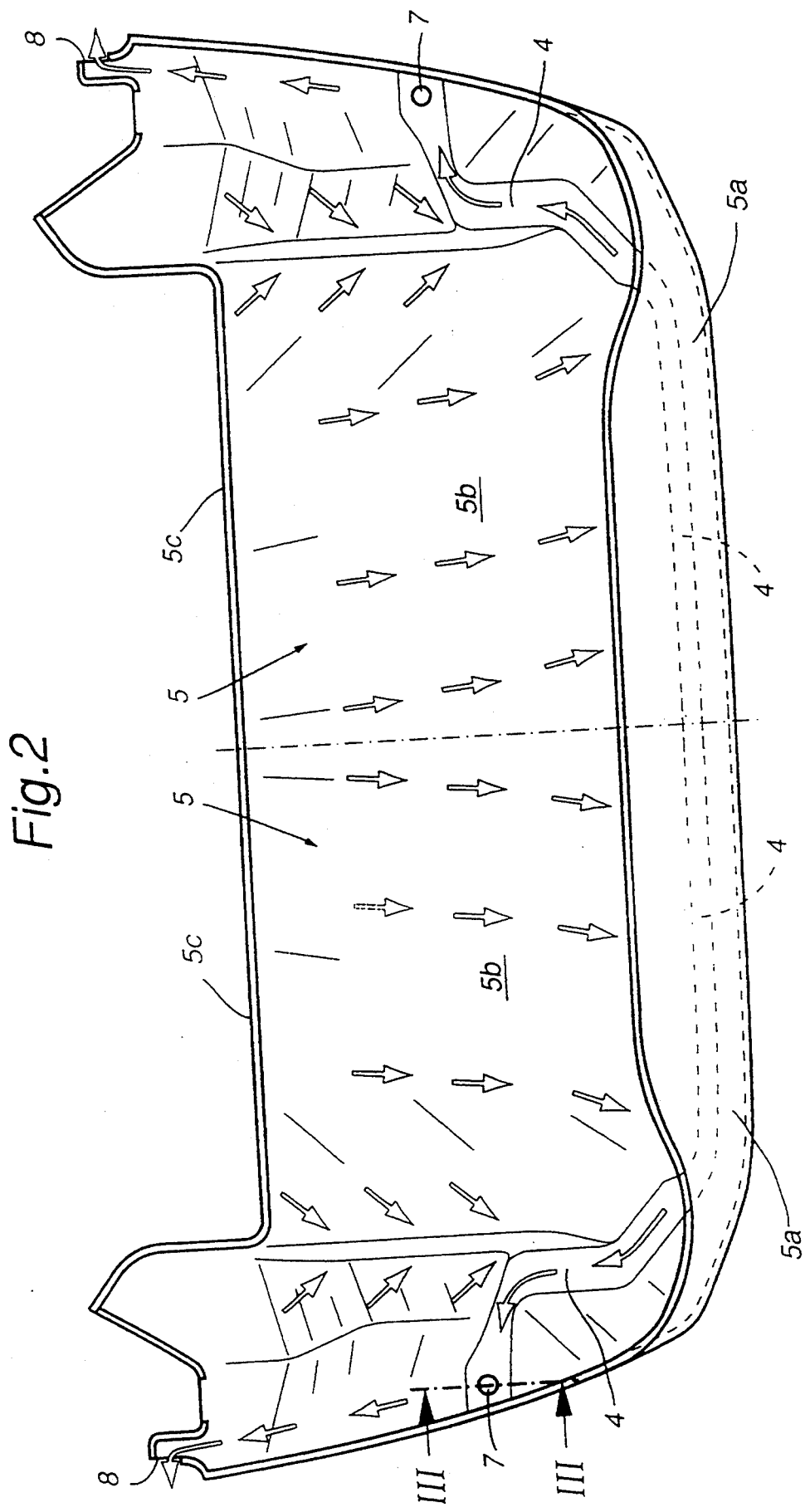
FIG. 2 is a plan view of an insert fitted in the top cover box of FIG. 1.

As is apparent in association with the plain view of the mirror-symmetric molding 5 according to FIG. 2, the recess 4 extends as a conducting channel along the rear wall 5a to the side where, on reaching the lateral leg of the top cover box 1, it makes a transition into a longitudinal section of the conducting channel which extends obliquely forwards and outwards towards an outflow aperture 7 which permits the water to flow out into the associated wheel housing of the bodywork. It will be understood that the recess 4 forming the conducting channel must exhibit a continuous downslope, starting from the center of the top cover box, towards the outflow aperture 7 which is situated in the lateral edge region of the bottom 5b, approximately at the center of the rear central cross-section of the molding 5. In order to ensure this while taking into account shaping of the bottom 1b and making best possible use of structural space, the recess 4 is angled many times in its forward-facing longitudinal region.

As is indicated by flow direction arrows, the water flowing out from the central region of the top cover box 1 is initially passed via the shortest route to the recess 4, and thereafter runs along the recess 4 to the outflow aperture 7.

In an approximation to the formation of the wheel housing, the bottom 5 is designed to curve forwards and downwards in an outer surface region lying in front of the outflow aperture 7. Superimposed on this downslope is a lateral downslope, whereby downward-flowing water is diverted to the outside of the top cover box 1 and passed to an overflow aperture 8 which is cut out from a front corner of the molding 5. The overflow aperture terminates in the window well of the associated rear window, from which water can flow out in a conventional manner through outflow apertures.

The two outflow apertures 7 of the top cover box 1, of which only the left-hand one is shown, are limited by a pipe connector piece 9 which is visible in the sectional drawing according to FIG. 3 and is in each case integrally molded onto the bottom 5b. The pipe connector piece 9 thus projecting from the underside of the bottom 5b passes through an oversize hole 10 in the sheet metal bottom 1b, which is arranged substantially flush with the pipe connector piece 9.

From the pipe connector piece 9, the water is diverted via a run-off hose 11 into the wheel housing, the run-off hose 11 consisting of elastic material. In order to secure the run-off hose 11, the latter has a turned-over rim which engages circumferentially around the sheet metal edge bordering the hole 10. With the molding 5 inserted, the run-off hose 11 is secured in its installed position above the pipe connector piece 9 projecting into it, since compression of its end region by the pipe connector piece 9 is only possible within narrow limits.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Top cover box for vehicles, which is lined on its walls and its bottom with a covering that has water-repellent properties, and which bottom and covering are provided with two outflow apertures in a low-lying region of the bottom, said outflow apertures of the covering and the bottom overlapping one another, the covering having a downslope in the bottom region which conducts water to the outflow apertures, wherein the covering of the top cover box is combined to form an insert encompassing walls and a bottom, which insert is of dimensionally stable and watertight design,
   wherein a groove-like recess is formed into the bottom of the insert and has a downslope leading to the outflow aperture,
   wherein the bottom of the insert comprises a large-format surface region with a downslope extending transversely to the longitudinal extent of the recess and towards the latter
   wherein the outflow apertures are arranged in the insert, the bottom of the insert having its entire downslope leading towards the outflow apertures,
   wherein the insert covers the two outflow apertures which are arranged laterally in the top cover box with mirror symmetry relative to each other, and
   wherein lateral halves of the insert have a downslope directed towards the associated outflow aperture.

2. Top cover box according to claim 1, wherein the downslope of the recess ends in a pipe connector piece which projects from the bottom of the insert and passes through an aperture in vehicle bodywork.

3. Top cover box according to claim 2, wherein the pipe connector piece is molded integrally on the insert at least over part of the length of the pipe connection piece.

4. Top cover box according to claim 1, wherein the bottom of the insert has a predominantly rearward-directed downslope and, in its rear edge region, makes the transition into the recess which extends as a conducting channel along the rear wall of the insert and ends laterally in longitudinal sections which run forward to the associated outflow aperture.

5. Top cover box according to claim 1, wherein the insert is a multi-layer molding with a barrier layer of plastic.

6. Top cover box according to claim 5, wherein the molding consists of a three-layer laminate, two outer layers of textile material being laminated onto a central layer of plastic.

7. Top cover box according to claim 6, wherein one outer layer of the molding consists of needled felt material and the other outer layer of a synthetic nonwoven fibre.

8. Top cover box according to claim 1, wherein the insert is releasably connected via spot-type fixing devices to the top cover box.

* * * * *